United States Patent [19]

Kurio et al.

[11] Patent Number: 5,089,543
[45] Date of Patent: Feb. 18, 1992

[54] EPOXY RESIN ELECTRICAL ENCAPSULATION COMPOSITION

[75] Inventors: Takuya Kurio, Yokkaichi; Yoshinori Nakanishi, Suzuka; Takuya Kurio, Yokkaichi; Yoshinori Nakanishi, Suzuka, all of Japan

[73] Assignee: Shell Oil Company, Houston, Tex.

[21] Appl. No.: 656,399

[22] Filed: Feb. 15, 1991

[51] Int. Cl.$^5$ ............................................. C08G 59/14
[52] U.S. Cl. ....................................... 523/466; 525/481; 525/482; 528/89; 528/108
[58] Field of Search ............... 525/481, 482; 523/466

[56] References Cited

U.S. PATENT DOCUMENTS 4,105,634  8/1978  Hanson et al. .................. 528/89

Primary Examiner—Paul R. Michl
Assistant Examiner—Christopher P. Rogers

[57] ABSTRACT

An electrical encapsulation composition containing an epoxy resin, a phenolic curing agent and a tris(dialkoxyphenyl)phosphine high cured glass transition temperature and good crack resistance.

7 Claims, No Drawings

EPOXY RESIN ELECTRICAL ENCAPSULATION COMPOSITION

BACKGROUND OF THE INVENTION

This invention relates to epoxy resin-based electrical encapsulation compositions.

Epoxy resins are used to encapsulate electrical components such as integrated circuits. The optimum properties for encapsulation resins include high glass transition temperature in the cured state, crack resistance under soldering, and low chlorine ion generation during cure.

Recent developments in the use and packaging of semiconductive elements include surface mounting of such elements. In the surface mounting process, the semiconductive device is immersed in a bath of molten solder and exposed to high temperature. Under these conditions, any moisture in the encapsulating material will expand and crack the encapsulating material.

The currently most widely used epoxy-based encapsulating formulation contains an o-cresol novolac epoxy resin, a phenol novolac curing agent, and triphenylphosphine cure accelerator. Such a formulation has a relatively low glass transition temperature and an unacceptably high tendency to crack during soldering.

Another problem which must be addressed in high-performance electrical encapsulation is corrosion of aluminum wiring by moisture and chloride ions. It is therefore important that encapsulation formulations have good moisture resistance and low chlorine ion generation during cure. These properties are to some extent dependent on the cure accelerator used. For example, triphenylphosphine reduces chlorine generation but is a less active curing accelerator, producing a cured material having a low glass transition temperature. On the other hand, imidazole cure accelerators tend to provide cured products having higher glass transition temperatures but an increased level of chloride ion generation.

The properties of the encapsulating material are also dependent on the epoxy resin used. Bishydroxybiphenyl-type resins are used for encapsulation, but these resins suffer from low glass transition temperature compared to EOCN-type resins. When the bishydroxybiphenyl-type resins are used, it is therefore of even greater importance to use a cure accelerator which maximizes cured glass transition temperature and minimizes chloride ion generation.

It is therefore an object of the invention to provide an epoxy-based electrical encapsulation formulation which has a high cured glass transition temperature, crack resistance under soldering and low chloride ion generation.

BRIEF SUMMARY OF THE INVENTION

According to the invention, an electrical encapsulation composition is provided comprising (a) an epoxy resin, (b) a phenolic curing agent for the epoxy resin, (c) a tris(dialkoxyphenyl)phosphine which can be represented by the formula

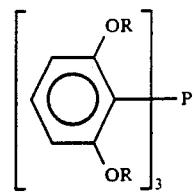

in which each R is independently selected from $C_{1-4}$ alkyl, and (d) an inorganic filler.

DETAILED DESCRIPTION OF THE INVENTION

The epoxy resin can be any polyglycidyl ether of a polyhydric phenol having an average of at least about 1.5 epoxide groups per molecule. Examples of such epoxy resins include those derived from bisphenol-A, bisphenol-F, hydroxybiphenyls, resorcine, hydroquinone, methylresorcine, phenol novolacs, cresol novolacs, resorcine novolacs, and bisphenol-A novolacs.

The most preferred invention compositions contain at least about 20 weight percent of a diglycidyl ether of a bishydroxybiphenyl which can be represented by the formula

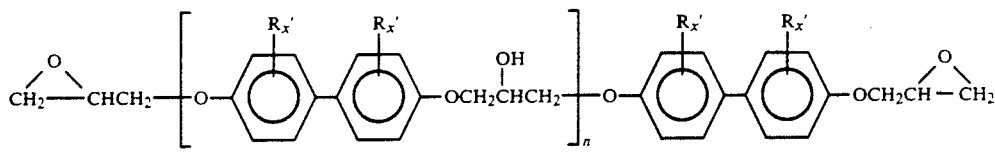

in which each R' is selected independently from hydrogen, halide and $C_{1-5}$ alkyl, x is an integer from 0 to 4, and n is an average value within the range of 0 to 3. The remainder of the epoxy component of the preferred compositions can be 0 to 80 weight percent of a second epoxy resin.

The bishydroxybiphenyl-derived epoxy resins can be prepared by reacting a bishydroxybiphenyl of the formula

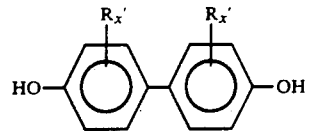

in which each R' is independently selected from hydrogen, halide and $C_{1-5}$ alkyl and x is an integer from 0 to 4, with an epihalohydrin such as epichlorohydrin in a base-catalyzed condensation reaction as is known in the art. Such bishydroxybiphenyls include, for example, 4,4'-dihydroxybiphenyl, 4,4'-dihydroxy-3,3'5,5'-tetramethylbiphenyl, 4,4'-dihydroxy-3,3',5,5'-tetramethyl-2-chlorobiphenyl, 4,4'-dihydroxy-3,3',5,5'-tetramethyl-2-bromobiphenyl, 4,4'-dihydroxy-3,3',5,5'-tetraethylbiphenyl, and the like. The preparation reaction will typically be carried out by contacting the dihydroxybiphenyl, epichlorohydrin, and an optional solvent such as isopropyl alcohol with dropwise addition of aqueous sodium hydroxide over a time of about one hour. The reaction temperature is gradually increased from about 35° C. to about 65° C. and is held at this temperature for about 30 minutes until completion of the reaction. The reaction product is then washed with water for removal of byproduct salts and sodium hydroxide. The reaction product is then heated at reduced pressure for removal of excess epichlorohydrin and isopropyl alcohol. The crude epoxy resin is then dissolved in toluene, to which is added an aqueous solution of sodium hydroxide for completion of the ring-closure reaction at a temperature of 65° C. and a time of about one hour. Sodium primary phosphate is then added to the reaction system to neutralize excess sodium hydroxide, followed by water-washing for removal of byproduct salts and by removal of isopropyl alcohol under reduced pressure. The reaction product will be a mixture of glycidyl ethers of the above formula (II) having an average n value within the range of 0 to 3.

The invention composition will further include a phenolic curing agent, with preferred curing agents having hydroxyl functionality of at least 2. Such curing agents include, for example, phenolic novolacs, cresol novolacs, resorcine novolacs and bisphenol-A novolacs. Such phenolic curing agents will generally be present in the composition in an amount within the range of about 20 to about 200 weight percent, based on the weight of the epoxy resin. The curing agent will preferably be present in an amount such that there are 0.5 to about 2, preferably about 1, phenolic hydroxyl groups per epoxy group.

The invention composition includes a tris(dialkoxyphenyl)phosphine cure accelerator which can be represented by formula (I) above. Such cure accelerators include, for example, tris(dimethoxyphenyl)phosphine, tris(diethoxyphenyl)phosphine and the like. The cure accelerator may be used alone or in combination with other compatible cure accelerators including tertiary amines such as 2-(dimethylaminomethyl)phenol, 2,4,6-tris(dimethylaminomethyl)phenol, benzyldimethylamine, alpha-methylbenzyldimethylamine; imidazoles such as 2-methylimidazole, 2-phenylimidazole, 2-undecylimidazole, 2-heptadecylimidazole and 2-ethyl-4-methylimidazole; and phosphines such as triphenylphosphine. The tris(dialkoxyphenyl)phosphine will be present in the composition in an amount within the range of about 0.1 to about 5% by weight, based on the weight of the epoxy resin component.

The invention encapsulation composition will also include an inorganic filler. Inorganic fillers include fused silica, crystalline silica, quartz glass powder, talc, calcium silicate powder, zirconium silicate powder, alumina powder, calcium carbonate powder, clay powder, barium sulfate powder, glass fibers and combinations of these. The inorganic filler will be present in the composition in an amount effective to impart to the cured product the desired modulus of elasticity, linear expansion coefficient and glass transition point, which can vary over the range of about 50 to about 90 weight percent, based on the weight of the composition.

The encapsulation compositions can also include constituents such as mold release agents, pigments, coupling agents, fire retardants and the like.

The encapsulating compositions can be prepared by melt-blending the components.

EXAMPLE 1

The diglycidyl ether of 3,3',5,5'-tetramethyl-4,4'-dihydroxybiphenyl was prepared as follows. In a reactor equipped with a stirrer, thermocouple and condenser were mixed 242 g of 3,3'5,5'-tetramethyl-4,4'-dihydroxybiphenyl, 1295 g epichlorohydrin and 504 g isopropyl alcohol to form a solution. This solution was heated to 35° C., followed by dropwise addition over one hour of 190 g of an aqueous solution of sodium hydroxide (48.5% by weight). During the NaOH addition, the temperature of the solution was gradually raised until the reaction system reached 65° C. when NaOH addition was complete. The reaction system was then maintained at 65° C. for 30 minutes. The reaction product mixture was washed with water for removal of byproduct salts and excess sodium hydroxide. The reaction product mixture was heated at reduced pressure for removal of excess epichlorohydrin and isopropyl alcohol. The remaining crude epoxy resin was dissolved in 596 g toluene, 12.9 g aqueous sodium hydroxide were added, and the mixture was heated at 65° C. for one hour for completion of the reaction. Sodium primary phosphate was then added to the reaction system to neutralize the excess sodium hydroxide, followed by water-washing for removal of byproduct salts and by removal of solvents under reduced pressure. The resulting epoxy resin had an epoxy equivalent weight of 185 g/eq. It will be referred to herein as "Epoxy Resin 1."

EXAMPLE 2

A similar process was used for glycidation of 4,4'-dihydroxybiphenyl to yield a light yellow solid having an epoxy equivalent weight of 164 g/eq. This resin will be referred to herein as "Epoxy Resin 2."

EXAMPLE 3

Formulated compositions were prepared from the epoxy resins shown in Table 1 melt-blending components with a mixing roll at a temperature in the range of 90° to 110° C. for five minutes, followed by cooling to a solid and grinding to prepared the molding formulation. Molding was carried out in a low-pressure transfer molding machine at a mold temperature of 180° C. and a molding time of 180 seconds to form a test piece for measurement of glass transition point and chlorine ion generation rate, and a 44-pin flat plastic package with dummy encapsulated elements, which was heat-cured at 180° C. for eight hours. Following heat-curing, the glass transition point, thermal resistance under soldering and chlorine ion generation rate were determined on each molded product. Test results are shown in Table 1.

TABLE 1

| Examples Formulated Compositions (part by weight) | Working Examples | | | Comparative Examples | | |
| --- | --- | --- | --- | --- | --- | --- |
| | 1 | 2 | 3 | 1 | 2 | 3 |
| Epoxy Resin 1 | 100 | — | — | 100 | 100 | — |
| Epoxy Resin 2 | — | 100 | — | — | — | — |
| O-cresol novolac-type epoxy resin (1) | — | — | 100 | — | — | 100 |
| Brominated bisphenol A-type epoxy resin (2) | 10 | 10 | 10 | 10 | 10 | 10 |
| Phenol novolac resin (3) | 58 | 65 | 54 | 58 | 58 | 54 |
| Tris(2,6-dimethoxyphenyl)phos- | 1.0 | 1.0 | 1.0 | — | — | — |

TABLE 1-continued

| Examples Formulated Compositions (part by weight) | Working Examples | | | Comparative Examples | | |
|---|---|---|---|---|---|---|
| | 1 | 2 | 3 | 1 | 2 | 3 |
| phine | | | | | | |
| Triphenyl phosphine | — | — | — | 1.0 | — | 1.0 |
| 2-phenylimidazole | — | — | — | — | 1.0 | — |
| Silica powder (4) | 392 | 408 | 383 | 392 | 392 | 383 |
| Antimony trioxide | 10 | 10 | 10 | 10 | 10 | 10 |
| Carnauba wax | 1.0 | 1.0 | 1.0 | 1.0 | 1.0 | 1.0 |
| Epoxy silane (5) | 1.0 | 1.0 | 1.0 | 1.0 | 1.0 | 1.0 |
| Test Results | | | | | | |
| Glass transition temperature (°C.) (6) | 175 | 182 | 184 | 145 | 173 | 165 |
| Thermal resistance under soldering (7) | 0/16 | 0/16 | 1/16 | 11/16 | 2/16 | 14/16 |
| Chlorine ion generation rate (ppm) (8) | 2 | 4 | 2 | 2 | 15 | 3 |

(1) Epikote ® 180H65 having an epoxy equivalent of 201, a product of Yuka Shell Epoxy K.K.
(2) Epikote 5050 ®, having an epoxy equivalent of 385 and a bromine content of 49%, a product of Yuka Shell Epoxy K.K.
(3) Phenol novolac having a softening point of 85° C., a product of Gunei Chemical K.K.
(4) RD-8 ®, a product of Ryushinsha K.K.
(5) KBM-403 ®, a product of Shinetsu Chemical K.K.
(6) Determined by TMA from transition point in thermal expansion curve
(7) Determined from the number of cracks formed in sixteen pieces of flat plastic packages exposed to moisture at 85° C. and 85% RH for 168 hours, followed by being immersed in bath of molten solder at 260° C. for ten seconds.
(8) The cured molded materials were crushed to a particle size of 100 mesh-pass. 5 g of the material together with 50 g of distilled water was introduced into a pressure vessel followed by extraction therewith at 180° C. for 24 hours, and then the amount of generating chlorine ion in the water was determined

We claim:

1. A composition comprising:

(a) an epoxy resin;
   (b) a phenolic curing agent for the epoxy resin;
   (c) from about 0.1 to about 5 weight percent, based on the weight of component (a), of a tris(dialkoxyphenyl)phosphine which can be represented by the formula:

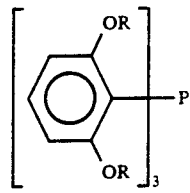

in which each R is independently selected from $C_{1-4}$ alkyl, and
   (d) from about 50 to about 90 weight percent, based on the weight of the composition, of an inorganic filler.

2. The composition of claim 1 in which the epoxy resin comprises a diglycidyl ether of the formula

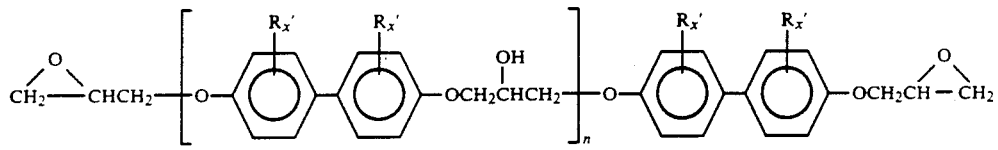

in which each R' is independently selected from hydrogen atoms, halogen atoms and $C_{1-5}$ alkyl, x is an integer from 0 to 4, and n is a number within the range of 0 to 3.

3. The composition of claim 2 in which the epoxy resin further comprises a polyglycidyl ether of a polyhydric phenol.

4. The composition of claim 2 in which component (c) is tris(2,6-dimethoxyphenyl)phosphine.

5. The composition of claim 2 in which the epoxy resin comprises at least one of the diglycidyl ethers of 3,3',5,5'-tetramethyl-4,4'dihydroxybiphenyl and 4,4'-dihydroxybiphenyl.

6. The composition of claim 5 in which component (c) is tris(2,6-dimethoxyphenyl)phosphine.

7. The composition of claim 6 in which the inorganic filler is silica.

* * * * *